United States Patent
Lang et al.

(10) Patent No.: US 7,652,075 B2
(45) Date of Patent: Jan. 26, 2010

(54) SURFACE-COMPACTED FOAM

(75) Inventors: Uwe Lang, Nieste (DE); Roland Geduldig, Buettelborn (DE)

(73) Assignee: Röhm GmbH & Co. KG, Darmstadt (DE)

( * ) Notice: Subject to any disclaimer, the term of this patent is extended or adjusted under 35 U.S.C. 154(b) by 979 days.

(21) Appl. No.: 10/510,706

(22) PCT Filed: Jun. 12, 2003

(86) PCT No.: PCT/EP03/06184

§ 371 (c)(1),
(2), (4) Date: Oct. 15, 2004

(87) PCT Pub. No.: WO2004/007600

PCT Pub. Date: Jan. 22, 2004

(65) Prior Publication Data

US 2005/0182239 A1 Aug. 18, 2005

(30) Foreign Application Priority Data

Jul. 12, 2002 (DE) ................................ 102 31 830

(51) Int. Cl.
*C08J 9/34* (2006.01)
(52) U.S. Cl. .......................... 521/51; 521/50.5; 521/88; 521/94; 521/149; 156/79; 156/245; 264/45.5; 264/45.6; 264/46.6; 264/321
(58) Field of Classification Search ........................ None
See application file for complete search history.

(56) References Cited

U.S. PATENT DOCUMENTS

| | | | | |
|---|---|---|---|---|
| 4,358,505 A | * | 11/1982 | Narumiya et al. | ............ 428/332 |
| 4,996,109 A | | 2/1991 | Krieg et al. | |
| 5,152,856 A | | 10/1992 | Uldrich et al. | |
| 5,605,440 A | * | 2/1997 | Bocoviz et al. | ............. 415/200 |
| 2004/0247152 A1 | * | 12/2004 | Greb et al. | ................... 381/423 |

FOREIGN PATENT DOCUMENTS

| | | |
|---|---|---|
| DE | 2 147 582 | 3/1972 |
| EP | 0 356 714 | 3/1990 |
| JP | 5-124096 | 5/1993 |
| JP | 10-316796 | 12/1998 |

OTHER PUBLICATIONS

ROHACELL RIST, Product Technical Information, pp. 1-2.*
Rohacell : PMI—Rigid Foam, pp. 1-6. Technical publication by Rohm Tech Inc.*

* cited by examiner

*Primary Examiner*—Vasu Jagannathan
*Assistant Examiner*—Gennadiy Mesh
(74) *Attorney, Agent, or Firm*—Oblon, Spivak, McClelland, Maier & Neustadt, L.L.P.

(57) ABSTRACT

The present invention relates to a process for producing ROHACELL® foams with a compacted surface. Markedly less adhesive then has to be applied during lamination and the good mechanical properties of the ROHACELL® foams are retained. The invention further permits the use of ROHACELL® foams as a removable core.

10 Claims, No Drawings

SURFACE-COMPACTED FOAM

FIELD OF THE INVENTION

The present invention relates to a process for producing foams with compacted surfaces, to the foam with the compacted surfaces and to the use of the foam of the invention.

PRIOR ART

DE 19 925 787 describes a process for the production of loudspeaker membranes by laminating a foam body made from ROHACELL® to an outer layer. The outer layer serves to increase strength. The lamination takes place in a press at temperatures above 160° C. and at pressures >0.4 MPa. Nothing is said about the mechanical properties of the synthetic polymer foam moulding alone, without the outer layer applied by lamination.

DE 2 147 528 describes a moulding with cellular cross section and with an integral coherent skin, the moulding being produced by applying heat and pressure to an emulsion polymer made from acrylic and methacrylic esters and vinyl acetate. The coherent skin can also bear decorative enhancements.

DE 2 229 465 describes cellular mouldings with integral transparent windows. An emulsion polymer made from acrylates and methacrylates is charged to a suitable mould and formed by pressing between two heated mould plates to give a transparent polymer at the desired locations.

In both cases, smooth surfaces with high gloss are obtained.

EP 272 359 describes a process for producing a composite body in which a foam core made from PVC or PU is laminated and is installed into a close mould which corresponds to the composite body to be produced. The expansion pressure of the foam serves to produce the composite between foam and laminate.

Object

Synthetic polymer foam bodies made from ROHACELL® are known and are marketed by Röhm GmbH & Co. KG. They serve for the production of parts from a core made from ROHACELL® and an outer layer. The outer layer used may comprise any known type of sheet which is stable when exposed to the processing parameters, such as pressure and temperature, needed for production of the final product. These include films or foils comprising polypropylene, polyester, polyamide, polyurethane, polyvinyl chloride, polymethyl (meth)acrylate, and/or comprising metal, such as aluminium. Use may moreover preferably be made of mats or webs which encompass glass fibres, carbon fibres and/or aramid fibres. The outer layer used may also comprise webs which have a multilayer structure.

Use may preferably be made of prepregs, for example. These are webs pre-impregnated with curable synthetic polymers, mostly glass fibre mats or glass filament fabrics, which can be processed to give mouldings or semifinished products by hot press moulding. These include the materials known as GMT and SMC.

Synthetic polymers reinforced with carbon fibre are also known, these being particularly suitable as outer layers.

The thickness of the outer layer is preferably in the range from 0.05 to 10 mm, with preference in the range from 0.1 to 5 mm and very particularly preferably in the range from 0.5 to 2 mm.

An adhesive may also be used to improve adhesion.

The amount of adhesive to be applied represents a problem. In usual applications the amount of adhesive is about 500 g/m² of bonding surface. For applications where weight is critical this represents a problem, because some of the adhesive penetrates into the pores of the foam and becomes unavailable for forming the adhesive layer.

The solution to this problem hitherto has been to use a light knife-applied composition to smooth the foam surface in an operation prior to adhesive application.

However, this process is disadvantageous because it requires an additional operation.

An object was therefore to provide a synthetic polymer foam body which exhibits reduced resin absorption for the same adhesion.

Solution

The foam bodies relevant for the process of the invention are composed of poly(meth)acrylimide foam.

The term (meth)arylic encompasses methacrylic, acrylic, and mixtures of the two.

Poly(meth)acrylimide foams for core layers of membranes contain repeat units which can be represented by formula (I)

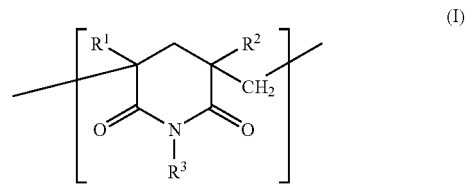

where
R¹ and R² are identical or different and are hydrogen or a methyl group, and
R³ is hydrogen or an alkyl or aryl radical having up to 20 carbon atoms, preferably hydrogen.

Units of the structure (I) preferably form more than 30% by weight, particularly preferably more than 50% by weight, and very particularly preferably more than 80% by weight, of the poly(meth)acrylimide foam.

The production of rigid poly(meth)acrylimide foams which can be used according to the invention is known, and has been disclosed in GB Patents 1 078 425 and 1 045 229, DE Patent 1 817 156 (=U.S. Pat. No. 3,627,711) or DE Patent 27 26 259 (=U.S. Pat. No. 4,139,685), for example.

The units of the structural formula (I) can be formed, for example, from adjacent units of (meth)acrylic acid and of (meth)acrylonitrile through a cyclizing isomerization reaction on heating to 150-250° C. (cf. DE-C 18 17 156, DE-C 27 26 259, EP-B 146 892). A precursor is usually first produced by polymerizing the monomers in the presence of a free-radical initiator at low temperatures, e.g. from 30 to 60° C., with subsequent heating to 60-120° C., and this is then foamed by a blowing agent present, through heating to about 180-250° C. (see EP-B 356 714).

One way in which this may be achieved is first to form a copolymer which contains (meth)acrylic acid and (meth)acrylonitrile, preferably in a molar ratio of from 2:3 to 3:2.

These copolymers may moreover contain other comonomers, e.g. esters of acrylic or methacrylic acid, in particular with lower alcohols having from 1 to 4 carbon atoms, styrene, maleic acid or its anhydride, itaconic acid or its anhydride, vinylpyrrolidone, vinyl chloride or vinylidene chloride. The proportion of the comonomers, which are impossible or very difficult to cyclize, is not to exceed 30% by weight, preferably 10% by weight.

Other monomers which may be used advantageously, again in a known manner, are small amounts of crosslinking agents, e.g. allyl acrylate, allyl methacrylate, ethylene glycol diacrylate or ethylene glycol dimethacrylate, or polyvalent metal salts of acrylic or methacrylic acid, e.g. magnesium methacrylate. The quantitative proportions may be from 0.005 to 5% by weight, for example.

The precursors may moreover comprise conventional additives. These include antistatic agents, antioxidants, mould-release agents, flame retardants, lubricants, dyes, flow improvers, fillers, light stabilizers and organic phosphorus compounds, such as phosphites or phosphonates, pigments, weathering stabilizers and plasticizers.

The polymerization initiators used comprise those which are conventional per se for the polymerization of methacrylates, e.g. azo compounds, such as azodiiso-butyronitrile, and also peroxides, such as dibenzoyl peroxide or dilauroyl peroxide, or else other peroxide compounds, such as tert-butyl peroctanoate or perketals, or else, where appropriate, redox initiators (cf. in this connection H. Rauch-Puntigam, Th. Völker, Acryl- und Methacrylverbindungen [Acrylic and methacrylic compounds], Springer, Heidelberg, 1967 or Kirk-Othmer, Encyclopaedia of Chemical Technology, Vol. 1, pp. 286 et seq., John Wiley & Sons, New York, 1978), for example. The amounts preferably used of the polymerization initiators are from 0.01 to 0.3% by weight, based on the starting materials. It can also be advantageous to combine polymerization initiators with different decomposition time and decomposition temperature. An example of a highly suitable method is the simultaneous use of tert-butyl perpivalate, tert-butyl perbenzoate and tert-butyl 2-ethylperhexanoate.

To foam the copolymer during the conversion to a polymer containing imide groups, use is made in a known manner of blowing agents which form a gas phase at from 150 to 250° C. through decomposition or vaporization. Blowing agents having an amide structure, e.g. urea, monomethylurea or N,N'-dimethylurea, formamide or monomethylformamide, decompose to release ammonia or amines, which can contribute to additional formation of imide groups. However, use may also be made of nitrogen-free blowing agents, such as formic acid, water or monohydric aliphatic alcohols having from 3 to 8 carbon atoms, e.g. propanol, butanol, isobutanol, pentanols or hexanol. The usual amounts of blowing agents used in the reaction mixture are from about 0.5 to 8% by weight, based on the monomers used.

A polymethacrylimide foam which may be used with very particular preference may be obtained through the following steps, for example:

1. Production of a polymer sheet by free-radical polymerization in the presence of one or more initiators and also, where appropriate, of other conventional additives, these having been listed above by way of example, composed of
   (a) a monomer mixture made from 40-60% by weight of methacrylonitrile, 60-40% by weight of methacrylic acid and, where appropriate, up to 20% by weight, based on the entirety of methacrylic acid and methacrylonitrile, of other monofunctional monomers with vinyl unsaturation
   (b) from 0.5 to 8% by weight of a blowing agent mixture made from formamide or monomethylformamide and a monohydric aliphatic alcohol having from 3 to 8 carbon atoms in the molecule
   (c) a crosslinking agent system which is composed of
      (c.1) from 0.005 to 5% by weight of a compound having vinylic unsaturation and having at least two double bonds in the molecule and capable of free-radical polymerization, and
      (c.2) from 1 to 5% by weight of magnesium oxide dispersed in the monomer mixture
2. foaming the sheet at temperatures of 200 to 260° C. to give the polymethacrylimide sheet, and then
3. two steps of heat treatment, the first step being composed of from 2 to 6 hours at from 100 to 130° C., and the second step being composed of from 32 to 64 hours at from 180 to 220° C.

Polymethacrylimides with high heat resistance may moreover be obtained by reacting polymethyl methacrylate or its copolymers with primary amines, which likewise may be used according to the invention. Representing the great variety of examples of this polymer-analogous imidation, mention may be made of: U.S. Pat. No. 4,246,374, EP 216 505 A2, EP 860 821. High heat resistance may be achieved here either by using arylamines (JP 05222119 A2) or by using specific comonomers (EP 561 230 A2, EP 577 002 A1). However, the products of all of these reactions are not foams but solid polymers which have to be foamed in a separate second step if a foam is to be obtained. Techniques for this purpose are also known to those skilled in the art.

Rigid poly(meth)acrylimide foams may also be obtained commercially, an example being ROHACELL® from Röhm GmbH, which can be supplied with various densities and dimensions.

The density of the poly(meth)acrylimide foam prior to compaction is preferably in the range from 20 kg/m$^3$ to 180 kg/m$^3$, particularly preferably in the range from 50 to 110 kg/m$^3$.

Prior to compaction, the thickness of the foam body is in the range from 1 to 1 000 mm, in particular in the range from 5 to 500 mm, and very particularly preferably in the range from 10 to 300 mm.

In the subject-matter of the invention, the surface of the foam can be compacted by applying pressure and heat in a press.

The processes known as hot press moulding processes may generally be used for this purpose. These processes are well known to persons skilled in the art, and the invention also includes specific embodiments, such as twin-belt press moulding, SMC press moulding and GMT press moulding. The press moulding procedure preferably uses spacers, known as stops. These make it easier to set a desired level of compaction of the core layer, but no resultant restriction of the invention is intended.

The pressure to be exerted within the press is about 30% of the static compressive strength of the foam. These data are accessible in the datasheets for the appropriate ROHACELL® grades.

The temperature of the press is from 180° C. to 240° C. The level of surface compaction may be determined via the duration of the heating procedure.

If the edge regions of the synthetic polymer foam body are heated a thin compaction zone is obtained.

If the entire synthetic polymer foam body is heated complete compaction is obtained.

In each case a smooth surface is obtained.

The amount of adhesive which has to be applied falls from about 500 g/m$^2$ to less than 50 g/m$^2$.

When compared with the uncompacted foam, the foam of the invention has higher stiffness with low weight. There is also an improvement in impact performance, meaning that the surface compressive strength determined to DIN 5342 is greater than for the uncompacted foam.

The smooth surface of the foam body of the invention makes it possible for the first time to use the foam body of the invention as a removable core in fibre-composite components.

The pore structure of the surface of the foam hitherto made it difficult or impossible to remove the core, which was therefore often left in place. The foam of the invention now permits removal of the core from the interior of the finished laminated component.

PRODUCTION EXAMPLES

Example 1

Surface Compaction of ROHACELL® in a Press
1. Heat press (close to foaming temp.)
2. Insert cold foam
3. Close press to generate contact pressure (from 0 to the pressure which produces cold compaction, for ROHACELL® ideally about 30% of compressive strength)
4. The heated surface is compacted by further regulation of pressure and therefore further closure of the force-controlled press. The cold inner regions remain dimensionally stable and are not compacted
5. The desired final thickness (degree of forming) is prescribed by inserted stops
6. Once the final thickness has been achieved, the press and thus the ROHACELL® are to be cooled. It is important here that the ROHACELL® is dimensionally stable after removal.

Example 2

Surface Compaction of ROHACELL® Through Further Expansion in a Press
1. ROHACELL® and a stop are inserted in a cold or hot (above foaming temp.) press, the thickness of both being about the same. The pressure has to be set in such a way that the counterpressure of the ROHACELL® as it undergoes further foaming does not open the press or alter the position of the stops.
2. If the process is intended to run with a press which is initially cold, the press is now to be heated to above foaming temp.
3. Once the desired surface compaction has been achieved through further expansion, the press has to be cooled while closed. It is important here that the ROHACELL® is dimensionally stable after removal.

Example 3

Surface Compaction of ROHACELL® Through Further Expansion in Moulds
1. Insert ROHACELL® into a cold or hot (above foaming temp.) mould, the thickness being about the same as that of the cavity.
2. Close mould and, if a cold mould is used, now heat the mould above foaming temp.
3. Once the desired surface compaction has been achieved through further expansion, the mould has to be cooled while closed. It is important here that the ROHACELL® is dimensionally stable after removal.

Example 4

Continuous Surface Compaction of ROHACELL®
1. A suitable means of heating (heating plates, radiant sources, microwaves, hot air, hot rollers, or the like) is used to heat ROHACELL® continuously (close to the foaming temp.).
2. Downstream, the ROHACELL® is surface-compacted through surface pressure (cold rolls, rollers or the like). At the same time or downstream, the ROHACELL® has to be cooled sufficiently to achieve dimensional stability.

The invention claimed is:

1. A process for producing a surface-compacted foam comprising surface compacting the foam by heating and applying pressure thereto in a molding press, wherein the foam is a homogenous synthetic foam molding composed of poly(meth)acrylimide foam,
wherein the homogenous synthetic foam comprises an inner region,
wherein when the heating and pressure is applied to the foam, the inner region remains dimensionally stable, and
wherein the inner region and the surface-compacted region are both composed of the poly(meth)acrylimide foam.

2. The process according to claim 1, wherein the forming temperature is from 170° C. to 250° C.

3. The process according to claim 1, wherein the forming temperature is from 200° C. to 250° C.

4. The process according to claim 1, wherein the forming temperature is from 180° C. to 200° C.

5. The process according to claim 1, wherein the pressure during the forming process is from 0.1 MPa to 16 MPa.

6. The process according to claim 1, wherein the pressure during the forming process is from 0.1 MPa to 1 MPa.

7. The process according to claim 1, wherein the pressure during the forming process is from 1 MPa to 7 MPa.

8. A surface-compacted foam body, obtained by the process of claim 1, wherein resin absorption is less than 500 g/cm$^2$, and wherein the surface compressive strength, measured to DIN 5342, is at least 0.4 MPa.

9. The process according to claim 1, wherein only edge portions of the foam are heated.

10. The process according to claim 1, wherein the molding press uses spacers for setting a level of compaction.

* * * * *